United States Patent
Menon et al.

[11] Patent Number: 5,926,182
[45] Date of Patent: Jul. 20, 1999

[54] EFFICIENT RENDERING UTILIZING USER DEFINED SHIELDS AND WINDOWS

[75] Inventors: Jai P. Menon, Peekskill, N.Y.; Jarek Roman Rossignac, Atlanta, Ga.

[73] Assignee: International Business Machines Corporation, Armonk, N.Y.

[21] Appl. No.: 08/752,138

[22] Filed: Nov. 19, 1996

[51] Int. Cl.⁶ .................................................. G06F 15/00
[52] U.S. Cl. ........................................................ 345/421
[58] Field of Search .................................. 345/421, 422, 345/113, 114, 419

[56] References Cited

U.S. PATENT DOCUMENTS

| | | | |
|---|---|---|---|
| 5,027,292 | 6/1991 | Rossignac et al. | 395/122 |
| 5,268,995 | 12/1993 | Diefendorff et al. | 395/122 |
| 5,359,704 | 10/1994 | Rossignac et al. | 395/122 |
| 5,428,716 | 6/1995 | Brokenshire et al. | 395/121 |

OTHER PUBLICATIONS

Visibility Preprocessing for Interactive Walkthroughs, ACM Press Computer Graphics, vol. 25, No. 4, Jul. 1991, pp. 61–69.

Hierarchical Z–Buffer Visibility Computer Graphics Proceedings, Annual Conference Series, 1993 pp. 231–238.

*Primary Examiner*—Phu K. Nguyen
*Attorney, Agent, or Firm*—Jay P. Sbrollini; Perman & Green, LLP

[57] ABSTRACT

A shield is a piece of geometry, such as a rectangle, that defines active/inactive regions in the world coordinate system that depend upon the position and orientation of the camera with respect to the shield. The shield is distinct from the objects that represent the scene. A preprocessing step determines those objects (or portions of objects) of the scene that lie in the inactive region defined by each of the shields. Those objects (or portions of objects) that lie in the inactive region defined by each of the shields are forwarded to the graphics subsystem wherein the objects are rendered for display. On the other hand, those objects (or portions of objects) that lie in the active region defined by each of the shields are not forwarded to the graphics subsystem.

21 Claims, 11 Drawing Sheets

EFFICIENT RENDERING UTILIZING USER DEFINED SHIELDS AND WINDOWS

CROSS REFERENCE TO RELATED APPLICATIONS

The present application is related to U.S. patent application Ser. No. 08/752,139, filed concurrently herewith and assigned to the common assignee of the present application, herein incorporated by reference in its entirety.

BACKGROUND OF THE INVENTION

1. Technical Field

The invention relates generally to computer graphics systems, and, more particularly, to computer graphics systems that provide real-time interactive visualization of complex geometric models.

2. Description of the Related Art

Traditional computer graphics systems are used to model a scene of three-dimensional objects and render the scene for display on a two-dimensional display device such as a cathode ray tube or liquid crystal display. Typically, the three-dimensional objects of the scene are each represented by a multitude of polygons (or primitives) that approximate the shape of the object. The primitives that define an object are typically defined by coordinates in a local coordinate system. For example, one of the primitives that may be used to define an object is a triangle, which is defined by the coordinates of three vertices in the local coordinate system.

The rendering of a scene conventionally is divided into two stages: geometry processing and rasterization. Geometry processing typically includes a modeling transformation, lighting calculations, a viewing transformation, a clipping function, and viewport mapping. The modeling transformation transforms the primitives from the local coordinate system to a world coordinate system. The lighting calculations evaluate an illumination model at various locations: once per primitive for constant shading, once per vertex for Gouraud shading, or once per pixel for Phong shading. The viewing transformation transforms the primitives in world coordinates to a 3D screen coordinate system (sometimes referred to as the normalized projection coordinate system). The clipping function determines the primitives (or portions of the primitives) that are within the viewing frustrum. And viewport mapping maps the coordinates of the clipped primitives to the normalized device coordinate system (sometimes referred to as the 2D device coordinate system).

Rasterization is the process which converts the description of the clipped primitives generated during geometry processing into pixels for display. A typical primitive, as shown in FIG. 1A, is a triangle $T_1$. Other area or surface primitives conventionally are converted into one or more triangles prior to rasterization. Consequently, the conventional rasterization process need only to handle triangles. The triangle $T_1$ is represented by the (x,y,z) coordinates at each of its vertices. The (x,y) coordinates of a vertex tell its location in the plane of the display. The z coordinate tells how far the vertex is from the selected view point of the three-dimensional scene. Rasterization is typically divided into three tasks: scan conversion, shading, and visibility determination.

Scan conversion utilizes the (x,y) coordinates of the vertices of each triangle to compute a set of pixels S which is covered by the triangle.

Shading computes the colors of the set of pixels S covered by each triangle. There are numerous schemes for computing colors, some of which involve computationally intensive techniques such as texture mapping. Shading typically utilizes the lighting calculations described above with respect to geometric processing.

Visibility determination utilizes the z coordinate of each triangle to compute the set of pixels $S_v$ (a subset of S) which are "visible" for the triangle. The set $S_v$ will differ from the set S if any of the pixels in set S are covered by previously rasterized triangles whose z values are closer to the selected view point. Thus, for each triangle in the scene as described by all previously processed triangles, a pixel is "visible" if it is in the set $S_v$ or "hidden" if it is the set S but not in the set $S_v$. Moreover, a triangle is "all visible" if the set $S_v$ is identical to set S, "partially hidden" if the set $S_v$ is not identical to set S and set $S_v$ is not empty, or "all hidden" if set $S_v$ is empty. For example, FIG. 1B shows two triangles, triangle T1 and T2, wherein triangle T1 is partially hidden by triangle T2. Visibility determination is traditionally accomplished using a z-buffer technique. The Z-buffer stores an entry for each pixel that represents the z-value of the visible primitive at the given pixel. The z-value (Znew) of a set of pixels covered by a given triangle is determined through interpolation. For each pixel within the set, Znew at the given pixel is compared to the z-value (Zold) stored as an entry in the Z-buffer corresponding to the given pixel, and the entry Zold is updated with Znew according to results of the compare operation.

Rasterization is completed by writing the colors of the set of visible pixels $S_v$ to an image buffer for display.

As scenes become more and more complex, traditional rendering techniques are too computationally intensive for many graphics systems and result in degraded performance. Alternate rendering techniques suitable for complex scenes have been proposed. For example, U.S. Pat. No. 5,086,496, to Mulmuley, entitled "Method for Hidden Line and Surface Removal in a Three Dimensional Display" utilizes stripped partitions of the viewing window (which are defined by boundaries that intersect at least one image vertex) and visibility pointers to faces that are visible within a given partition to perform the visibility determination of the faces.

In another example, Green et al., "Hierarchical Z-Buffer Visibility", Proc. ACM SIGGRAPH 93, pp. 231–238, 1993, describe a combination of two hierarchical data structures, an object-space octree and an image-space Z-pyramid, to accelerate scan conversion.

In addition, Teller et al., "Visibility Preprocessing for Interactive Graphics", Proc. ACM SIGGRAPH 91, pp. 61–69, 1991, describes an algorithm utilized during a visibility preprocessing phase that subdivides a model into a plurality of cells and generates cell-to-cell visibility information (which represents, for a given cell, the set of cells that are partially or completely visible from at least one point within the given cell). During an interactive walkthrough phase, an observer with a known position and view frustrum moves through the model. At each frame, the cell containing the observer is identified, and the contents of potentially visible cells (which is derived from the cell-to-cell visibility information generated during the preprocessing phase) are retrieved from storage. The set of potentially visible cells is further reduced by culling it against the observer's view frustrum to produce eye-to-cell information (which represents the set of cells that are partially or completely visible to an observer within the specified view frustrum). The contents of the remaining visible cells, as identified by the eye-to-cell information, are then sent to a graphics pipeline for hidden-surface removal and rendering. Teller et al., "Global Visibility Algorithms for Illumination Computations", Proc. ACM SIGGRAPH 93, pp. 239–246, 1993, applies these visibility pre-processing algorithms to radiosity computations.

Although such alternate techniques are designed to accelerate visibility determination during rasterization, these techniques are inflexible and in most instances add computationally intensive tasks to the rendering process that outweigh their benefits. Thus, there is a need in the art to provide for flexible rendering techniques that can be tailored to meet the requirements dictated by the varying complexity and characteristics found in today's three-dimensional models and scenes.

SUMMARY OF THE INVENTION

The above-stated problems and related problems of the prior art are solved with the principles of the present invention, Efficient Rendering Utilizing User Defined Shields, which provides a mechanism that allows a user to define one or more shields. A shield is a piece of geometry, such as a rectangle, that defines active/inactive regions in the world coordinate system that depend upon the position and orientation of the camera with respect to the shield. The shield is distinct from the objects that represent the scene. A preprocessing step determines those objects (or portions of objects) of the scene that lie in the inactive region defined by each of the shields. Those objects (or portions of objects) that lie in the inactive region defined by each of the shields are forwarded to the graphics subsystem wherein the objects are rendered for display. On the other hand, those objects (or portions of objects) that lie in the active region defined by each of the shields are not forwarded to the graphics subsystem.

Detailed Description of the Preferred Embodiments

Figure 1A:
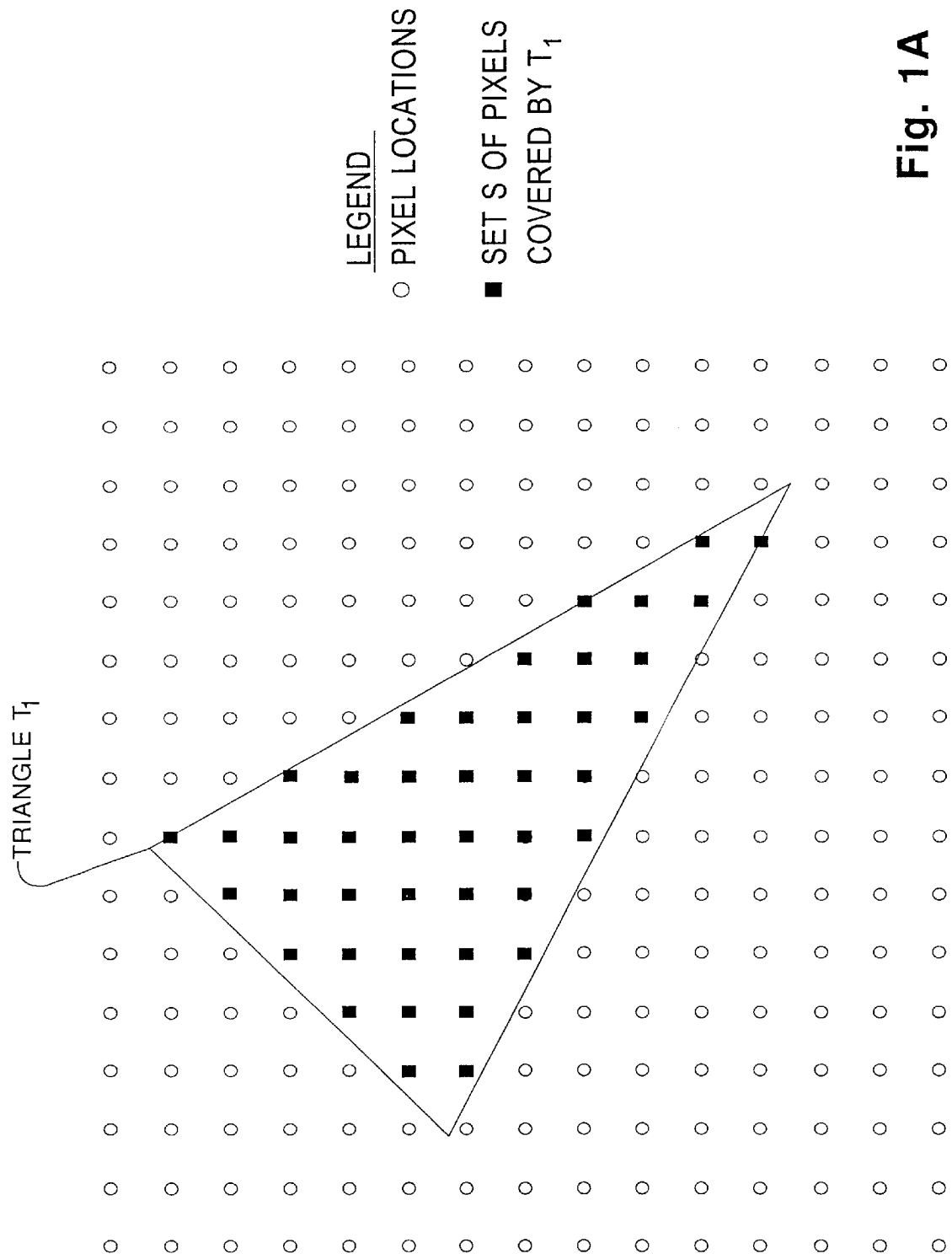
FIG. 1A is a pictorial representation of the rasterization of a triangle T1.
Figure 1B:
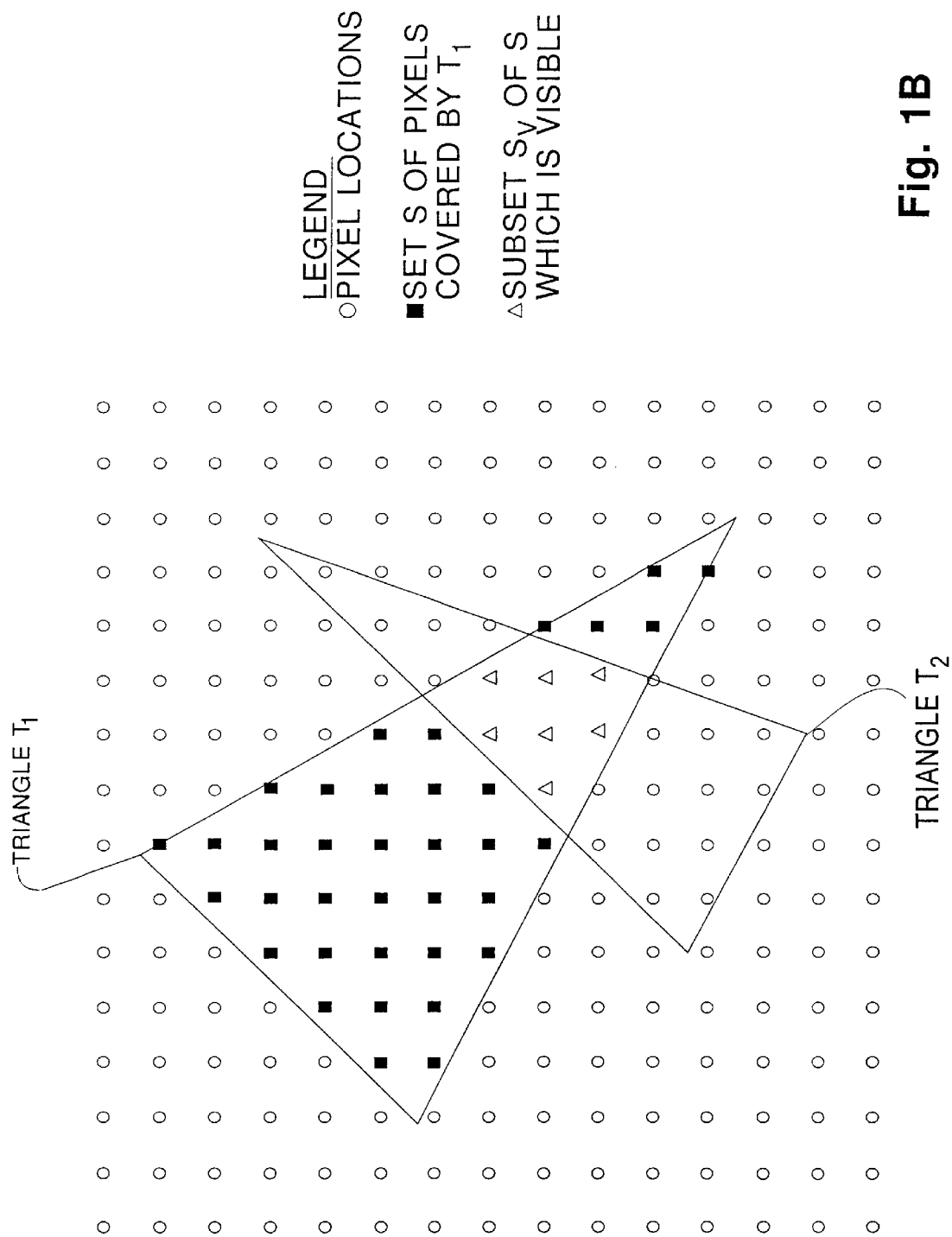
FIG. 1B is a pictorial representation of the rasterization of triangles T1 and T2, wherein triangle T1 is partially hidden by triangle T2.
Figure 2:
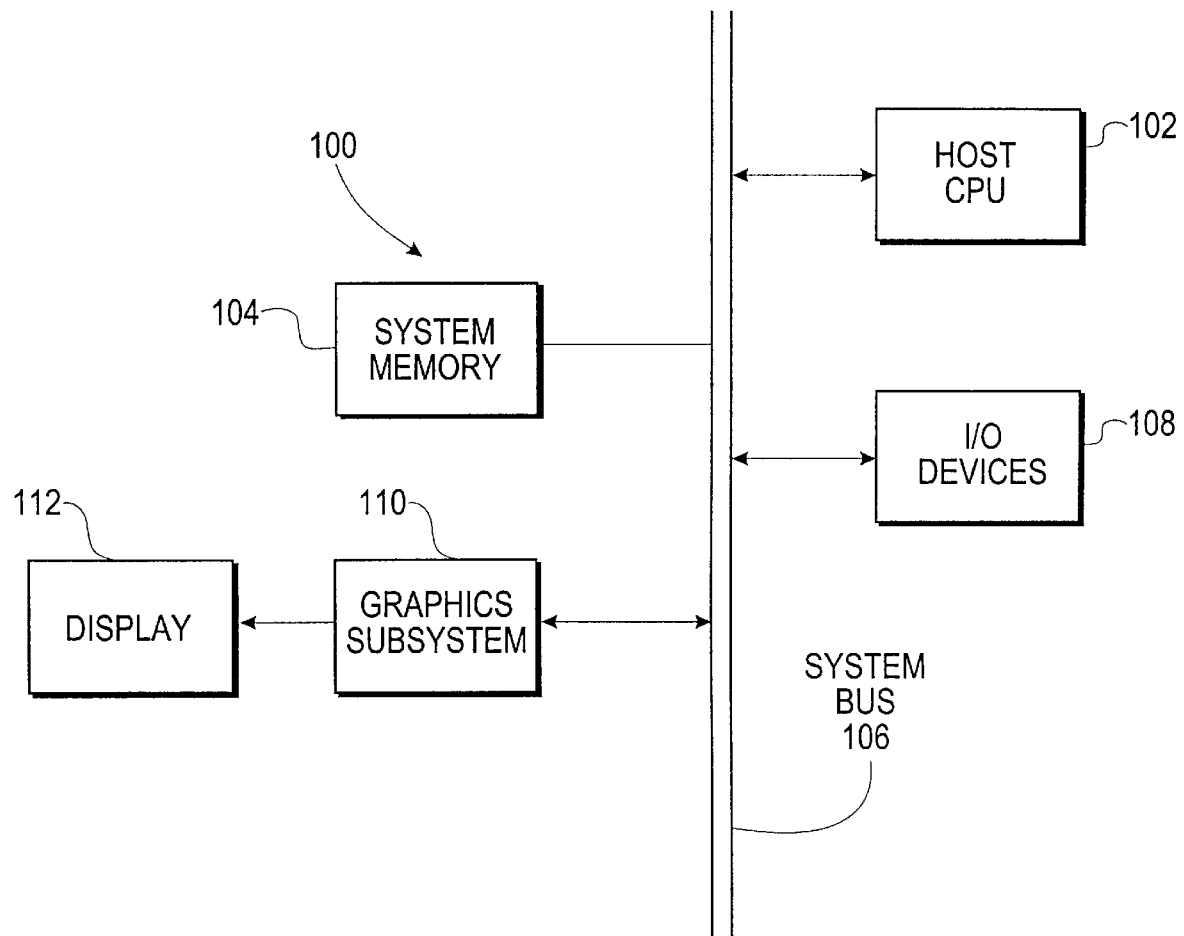
FIG. 2 is a functional block diagram of a graphics work station.

As shown in FIG. 2, a conventional graphics system 100 includes a host processor 102 which is coupled to a system memory 104 via a system bus 106. The system memory 104 consists of random access memory (RAM) that stores graphics data defining the objects contained in one or more three dimensional models. The graphics data that defines each object consists of coordinates in a local coordinate system and attributes (e.g. color, reflectance, texture) of primitives. The primitives are geometric entities such as a polygon, line or surface. Typically, the primitives are triangles defined by the coordinates of three vertices in the local coordinate system. In this case, the system memory 104 includes an ordered list of vertices of the triangles that define the surfaces of objects that make up a three dimensional scene. In addition, the system memory 104 may store a list of triangle identifiers that correspond to each of the triangles and transformation matrices. The transformation matrices are used to transform the objects of the scene from the local coordinate system to a world coordinate system, and thus specify the position, orientation and scale of the triangles in the scene.

Input/output (I/O) devices 108 interface to the host processor 102 via the system bus 106. The I/O devices may include a keyboard, template or touch pad for text entry, a pointing device such as a mouse, trackball, Spaceball or light pen for user input, and non-volatile storage such as a hard disk or CD-ROM for storing the graphics data and any application software. As is conventional, the graphics data and application software is loaded from the non-volatile storage to the system memory 104 for access by the system processor 102.

The application software typically includes one or more user interfaces that provides the user with the ability to update the view point (or camera) and thus navigate through the scene. In addition, the application software typically includes one or more user interfaces that provide the user with the ability to perform animations, which is the view from a series of pre-defined view points. When the view point is updated, the application software typically utilizes the transformation matrices stored in the system memory 104 to transform the primitives of the scene from the local coordinate system to a world coordinate system. The application software executing on the host processor 102 then supplies a graphics order to render the scene to a graphics subsystem 110 that interfaces to the system memory 104 via the system bus 106.

Figure 3:
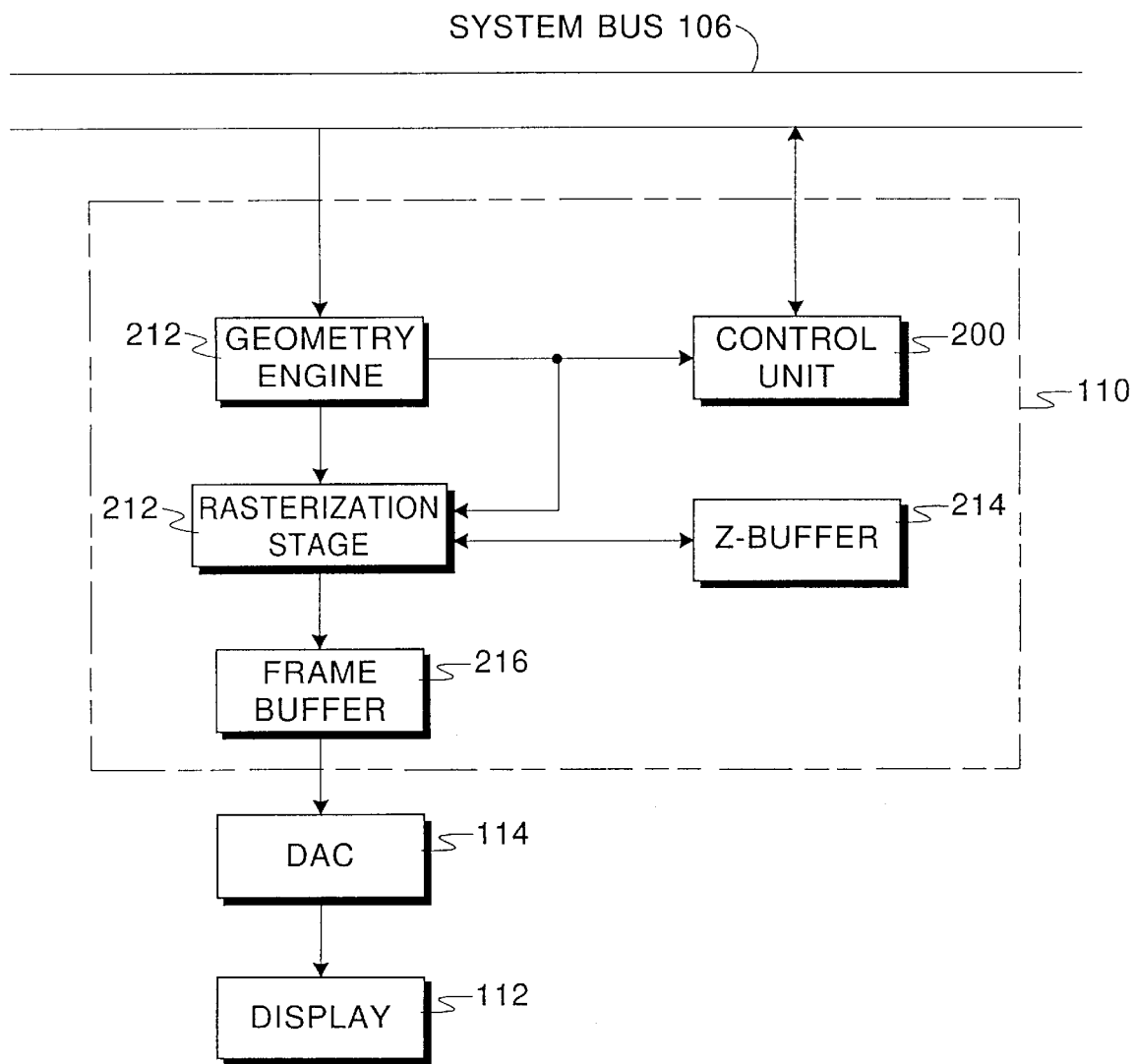
FIG. 3 is a functional block diagram of a graphics subsystem of the graphics work station of FIG. 2.

Generally, the graphics subsystem 110 operates to render the graphics data stored in the system memory 104 for display on a display area of a display device 112 according to the graphics orders transferred from the host processor 102 to the graphics subsystem 110. The display device 112 may utilize raster scan techniques or liquid crystal display techniques to display the pixels. The pixel data generated by the graphics subsystem 110 is in digital form. Typically, the display device 112 requires the pixel data in analog form. In this case, as shown in FIG. 3, a digital-to-analog converter 114 may be placed between the graphics subsystem 110 and the display device 112 to convert the pixel data from a digital to an analog form.

The graphics orders typically consist of a sequence of data blocks that include, or point to, the graphics data (e.g. coordinates and attributes of one or more primitives) that defines the primitives of the scene, associated transformation matrices, and any other necessary information required by the graphics subsystem 110. The primitives associated with the graphics orders are typically defined by the value of the geometric coordinates or homogeneous coordinates for each vertex of the primitive. In addition, graphics orders typically include, or point to, data defining normal vectors for the vertices of each primitive. The values of these coordinates and normal vectors are typically specified in the world coordinate system.

In addition, the transformation of the primitives of the scene from the local coordinate system to a world coordinate system may not be performed by the application executing on the host processor, but may be performed by the graphics subsystem. In this case, the graphics order supplied to the graphics subsystem includes, or points to the transformation matrices stored in the system memory 104, and the graphics subsystem utilizes the transformation matrices to transform the primitives of the scene from the local coordinate system to a world coordinate system.

Although the graphics subsystem 110 is illustrated as part of a graphics work station, the scope of the present invention is not limited thereto. Moreover, the graphics subsystem 110 of the present invention as described below may be implemented in hardware such as a gate array or a chip set that includes at least one programmable sequencer, memory, at least one integer processing unit and at least one floating point processing unit, if needed. In addition, the graphics subsystem 110 may include a parallel and/or pipelined architecture as shown in U.S. Pat. No. 4,876,644, commonly assigned to the assignee of the present invention and incorporated by reference herein in its entirety.

In the alternative, the graphics subsystem 10 (or portions thereof) as described below may be implemented in software together with a processor. The processor may be a conventional general purpose processor, the host processor 128, or a co-processor integrated with the host processor 128.

As shown in FIG. 3, the graphics subsystem 110 includes a control unit 200 that supervises the operation of the graphics subsystem 110. Upon receiving a graphics order to render a scene, the control unit 200 passes the graphics data associated with the graphics order on to a geometry engine 202. The geometry engine 202 transforms the graphics data associated with the graphics order from the world coordinate system to a 3D screen coordinate system (sometimes referred to as a normalized projection coordinate system), clips the graphics data against a predetermined view volume, and transforms the clipped data from the 3D screen coordinate system to a normalized device coordinate system (sometimes referred to as the 2D device coordinate system or the screen coordinate system). In addition, depending upon the shading algorithm to be applied, an illumination model is evaluated at various locations (i.e., the vertices of the primitives and/or the pixels covered by a given primitive). The transformed and clipped graphics data defined by coordinates in the normalized device coordinate system is then passed on to a rasterization stage 212.

The rasterization stage performs scan conversion thereby converting the transformed primitives into pixels, and performs shading calculations and visibility determination which generally stores each primitive's contribution at each pixel in at least one frame buffer 216 and a z-buffer 214. The Z-buffer 214 preferably contains sufficient memory to store a depth value for each pixel of the display 112. Conventionally, the depth value is stored as a 24-bit integer for each pixel. The frame buffer 216 preferably contains sufficient memory to store color data for each pixel of the display 112. Conventionally, the color data consists of three 8-bit integers representing red, green and blue (r,g,b) color values for each pixel. The pixel data is periodically output from the frame buffer 216 for display on the display device 112. The functionality of the geometry engine 202 and rasterization stage 212 may be organized in a variety of architectures. A more detailed discussion of such architectures may be found in Foley et. al., "Computer Graphics: Principles and Practice", pp. 855–920 (2nd Ed. 1990), herein incorporated by reference in its entirety.

According to the present invention, a mechanism is provided that allows a user to define one or more shields. A shield is a piece of geometry, such as a rectangle, that defines active/inactive regions in the world coordinate system that depend upon the position and orientation of the camera with respect to the shield. The shields are distinct from the objects that represent the scene. A preprocessing step determines those objects (or portions of objects) of the scene that lie in the inactive region defined by each of the shields. Those objects (or portions of objects) that lie in the inactive region defined by each of the shields are forwarded to the graphics subsystem wherein the objects are rendered for display. On the other hand, those objects (or portions of objects) that lie in the active region defined by each of the shields are not forwarded to the graphics subsystem. Preferably, the mechanism of the present invention is integrated into the application software that is loaded from non-volatile storage to the system memory 104 where it is executed by the system processor 102. In addition, the mechanism may be contained in a graphics library that is part of an application developers kit.

More specifically, the mechanism of the present invention includes a user interface that allows a user to define one or more shields. A shield is a piece of geometry that defines active/inactive regions in the world coordinate system that depend upon the position, orientation, and field of view of the camera with respect to the shield. Additional data, such as the sense of the shield as described below, may be associated with the shield to control the affectivity of the shield. The shield may be a two-dimensional piece of geometry (such as a rectangle, plane, or half-plane), or may be a three-dimensional piece of geometry (such as a parallelpiped). Any user interface that allows the user to specify (or draw) a piece of geometry and specify the position, orientation and scale of the piece of geometry in the world coordinate system may be used. For example, a user may specify a piece of geometry by instantiating a 3D-box centered around a point in space (called the cross) and using the mouse to drag the corners of the box to get a desirable size of the box. One or more the faces of the box may be used as a shield. The position of the shield/box may be set according to the position of the cross such that the box is aligned with the horizontal and vertical axes of the screen for the particular camera position. Another technique for defining a shield is to identify (select) several objects in the scene and use some interior geometry (e.g. box or cylinder or sphere) as the shield. In another example, the user interface may provide the user with the ability to select a piece of geometry from a stored library of geometry, and then specify the position, orientation and scale of the selected geometry in the world coordinate system.

In addition, the user interface may allow the user to control whether or not the shields are displayed along with the objects of the scene. To view the shields, the data representing the geometry that defines each shield is integrated into the graphics orders supplied to the graphics subsystem. In this case, the shields may have properties that distinguish the shields from other objects. For example, each of the shields may be represented by a wire-frame model, may have a distinctive color or cross hatching, may be displayed with transparency, or may have a texture representing objects behind the shield.

Figure 4A:
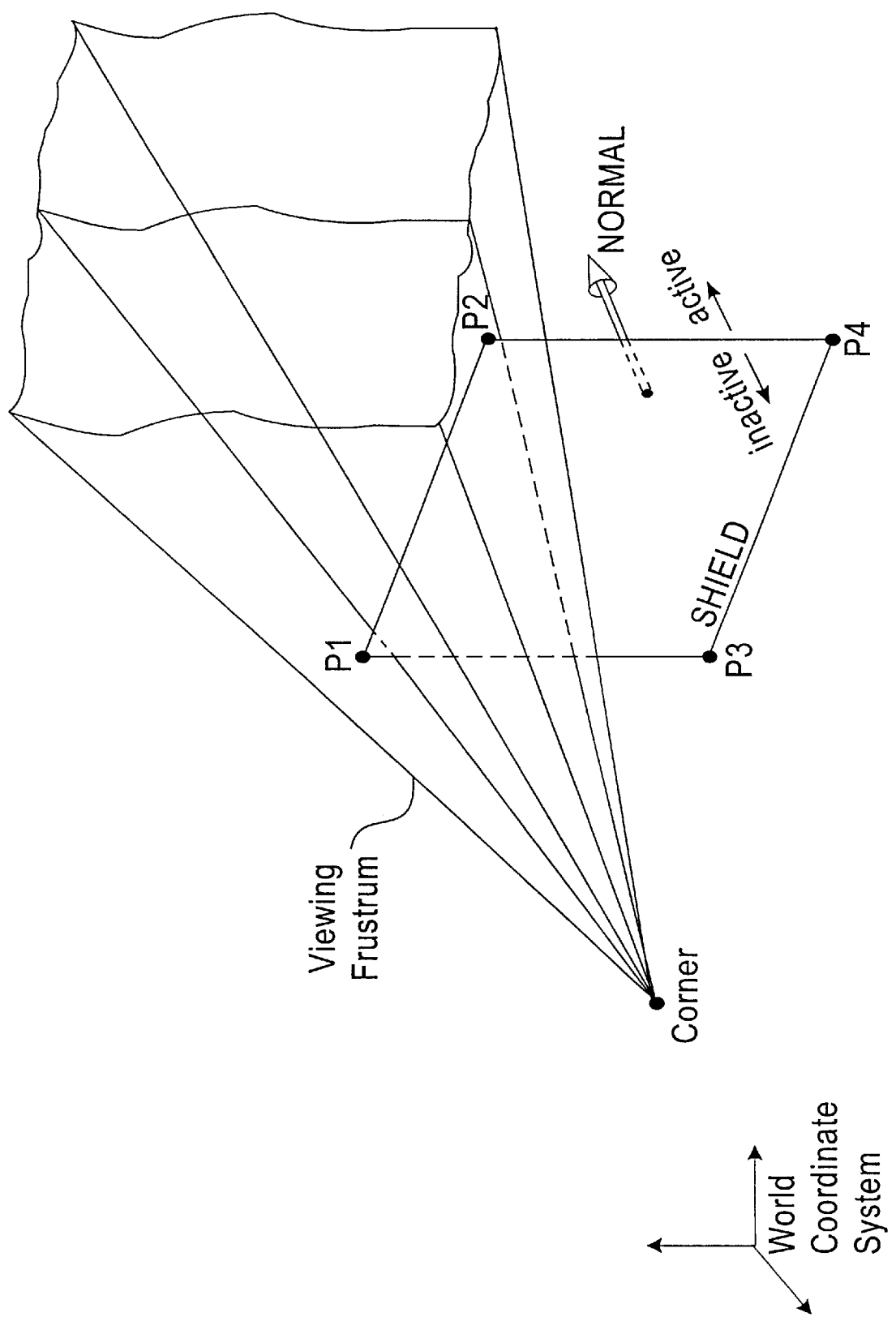
FIG. 4(A) illustrates a shield according to the present invention, and the relationship of the shield with respect to the viewing frustrum in the world coordinate system.

To further explain the concept of a shield, consider an example, as shown in FIG. 4(A), wherein a shield is defined by a rectangle having four points, p1,p2,p3,p4, and wherein each of the points p1,p2,p3,p4 is represented by geometric coordinates in the world coordinate system. In addition, a sense is associated with the rectangle that represents the side of the rectangle wherein lies the inactive region and the side of the rectangle wherein lies the active region. The sense of the shield may represented by a normal vector pointing towards the active region as shown in FIG. 4(A). In order to provide a user with the capability of viewing the active region of a shield, the normal vector may be displayed in response to user command. In the alternative, the shield may be displayed only when the viewpoint lies in the inactive region, i.e. the shield would not be displayed when the viewpoint is in the active portion.

The active/inactive regions defined by the shield depend upon the position, orientation, and field of view of the camera with respect to the shield. According to a first embodiment of the present invention, the affectivity of the shield depends upon whether the camera lies on the inactive side of the shield (as represented by the sense of the shield) or lies on the active side of the shield (as represented by the sense of the shield). If the camera lies on the active side of the shield, the shield has no affect on the visibility of objects within the scene. In other words, the active region is null, and the inactive region defined by the shield is all of the world space. However, if the camera lies on the inactive side of the shield, the active/inactive regions defined by the shield may have an affect on the visibility of objects.

Figure 4B:
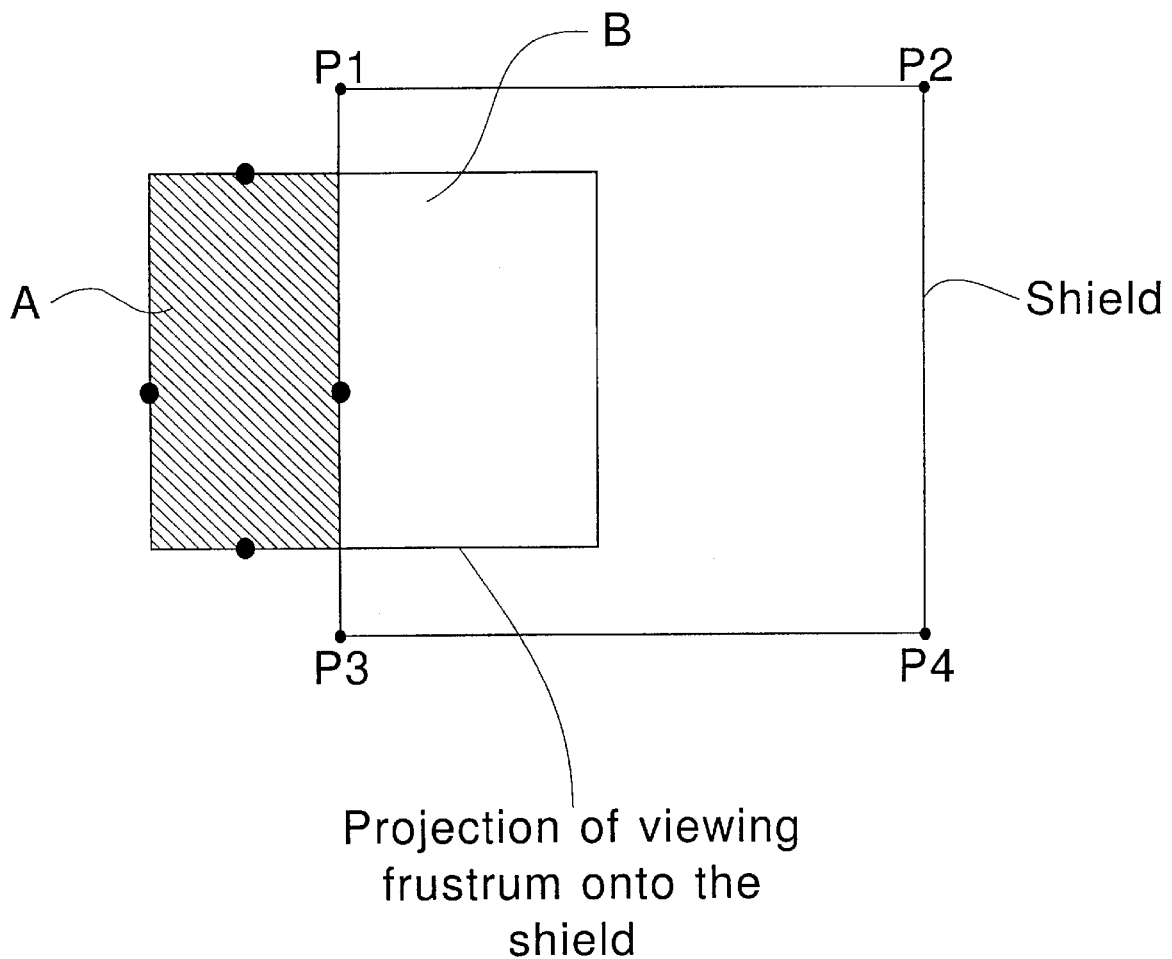
FIG. 4(B) illustrates in two dimensional space the intersection of the shield and the viewing frustrum of FIG. 4(A).

FIGS. 4(A) and (B) illustrate the active/inactive regions defined by the shield in the case where the camera lies on the inactive side of the rectangular shield. The position, orientation and field of view of the camera defines a viewing frustrum as illustrated in FIG. 4(A). As shown in FIG. 4(B), the projection of the viewing frustrum onto the shield defines a cross-hatched portion A wherein the viewing frustrum and the shield do not intersect, and a second portion B wherein the viewing frustrum intersects the shield. The active region defined by the rectangular shield of FIG. 4(A) is that part of the viewing frustrum that lies on the active side of the second portion (i.e., in this example, behind the second portion B). Similarly, the inactive region defined by the rectangular shield of FIG. 4(A) is that part of the viewing frustrum that:

(1) lies on the inactive side of the second portion B (i.e., in this example, in front of the second portion B); or (2) lies within the portion A.

Figure 6:
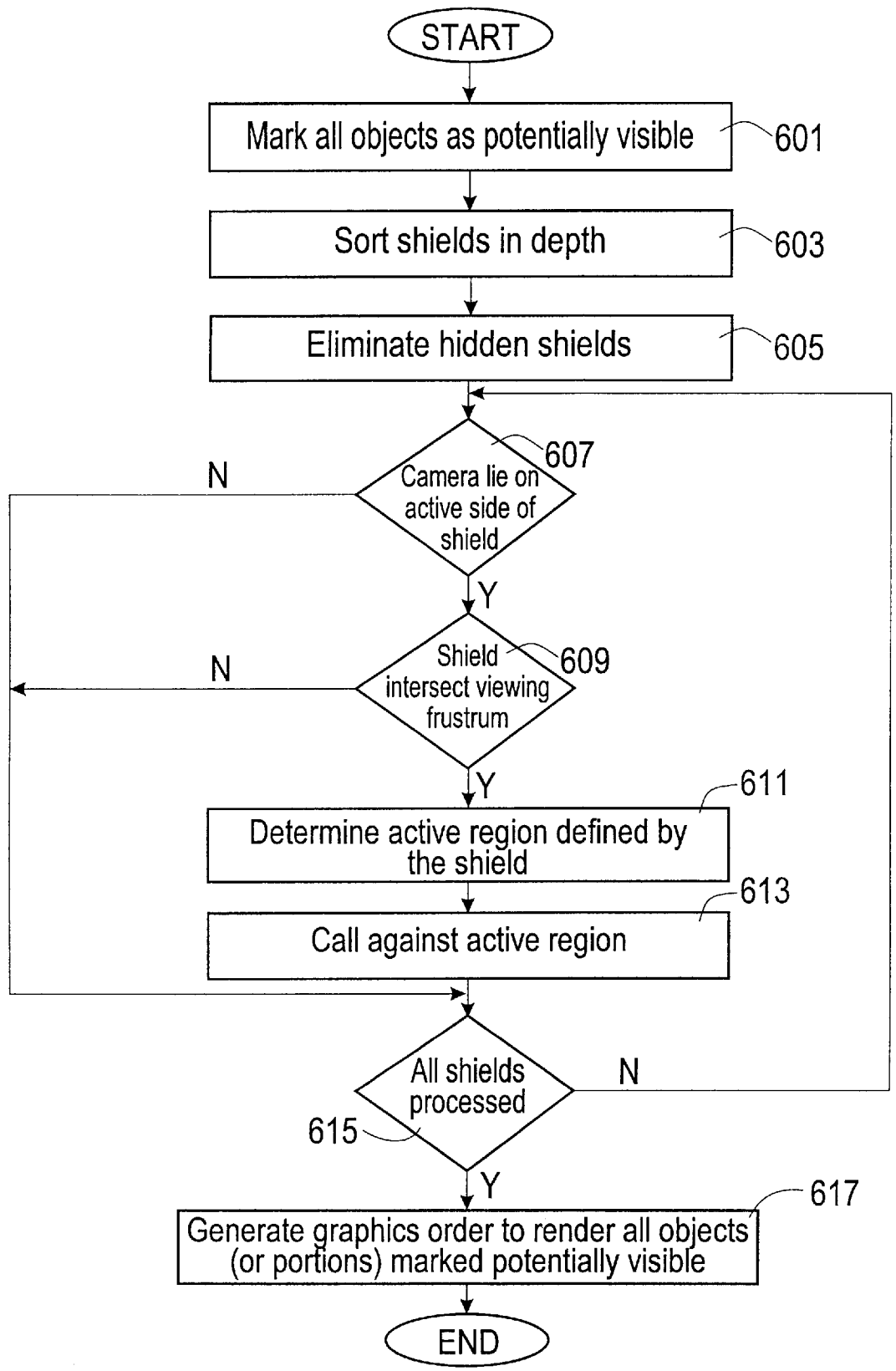
FIG. 6 is a flow chart illustrating the preprocessing step of the shields according to the present invention.

The preprocessing step determines the objects (or portions of the objects) that lie in the inactive region defined by each of the shields. Those objects (or portions of objects) that lie in the inactive region defined by each of the shields are forwarded to the graphics subsystem wherein the objects are rendered for display. As shown in FIG. 6, the preprocessing step begins in step 601 by marking all objects as potentially visible. This may be accomplished setting an identifier associated with each object of the scene to a predetermined value that indicates the object is potentially visible. In step 603, the shields are preferably sorted in depth. Then, in step 605, any shields hidden (or partially hidden) by one or more shields closer to the camera position are preferably eliminated. This may be accomplished by looping through the shields beginning with the shield the second furthest from the camera position and continuing until the shield closest to the camera has been processed as follows: if the current shield hides (or partially hides) according to a predetermined criteria a shield in back of the current shield, then the hidden shield (or portion thereof) may be eliminated. Steps 607 to 613 are then performed for each shield (or portion thereof) not eliminated in step 605. Preferably, steps 607 to 613 are performed for each shield not eliminated in step 605 in a sequence from the back-most shield (that shield furthest from the camera) to the front-most shield (that shield nearest to the camera).

In step 607, it is determined if the camera lies on the inactive side of the shield. Typically, the position of the camera may be represented by a look vector $(x_e, y_e, z_e)$. In addition, the rectangular shield lies in a plane which may be represented by a function $g(x,y,z)$ such that the inequality $g(x,y,z)>0$ represents the active region of the rectangular shield. In this case, it may be determined that the camera lies on the inactive side of the shield if $g(x_e, y_e, z_e) \leq 0$. If in step 607 it is determined that the camera lies on the inactive side, operation continues to step 609; otherwise the preprocessing step continues to step 615.

In step 609, it is determined if the shield intersects the viewing frustrum. This is a geometric test that can be performed using well known techniques in geometric modeling, such as the techniques described in C. M. Hoffman, "Geometric and Solid Modeling", Morgan Kaufmann Publishers, San Mateo, Calif., 1989, pp. 67–109, herein incorporated by reference in its entirety. If in step 609 it is determined that the shield intersects the viewing frustrum, operation continues to step 611; otherwise the preprocessing step continues to step 615.

Figure 5A:
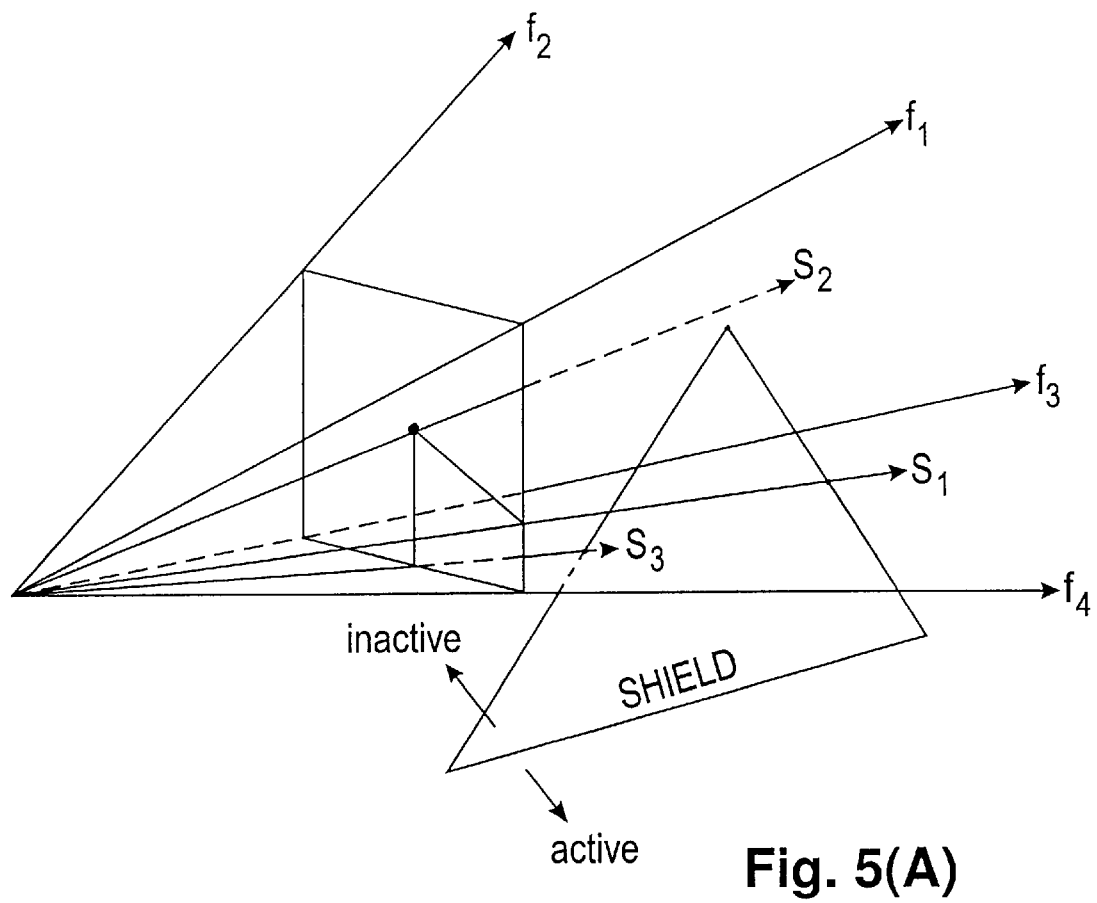
FIGS. 5(A) and (B) illustrate the active and inactive regions formed by the intersection of a shield and the viewing frustrum.
Figure 5B:
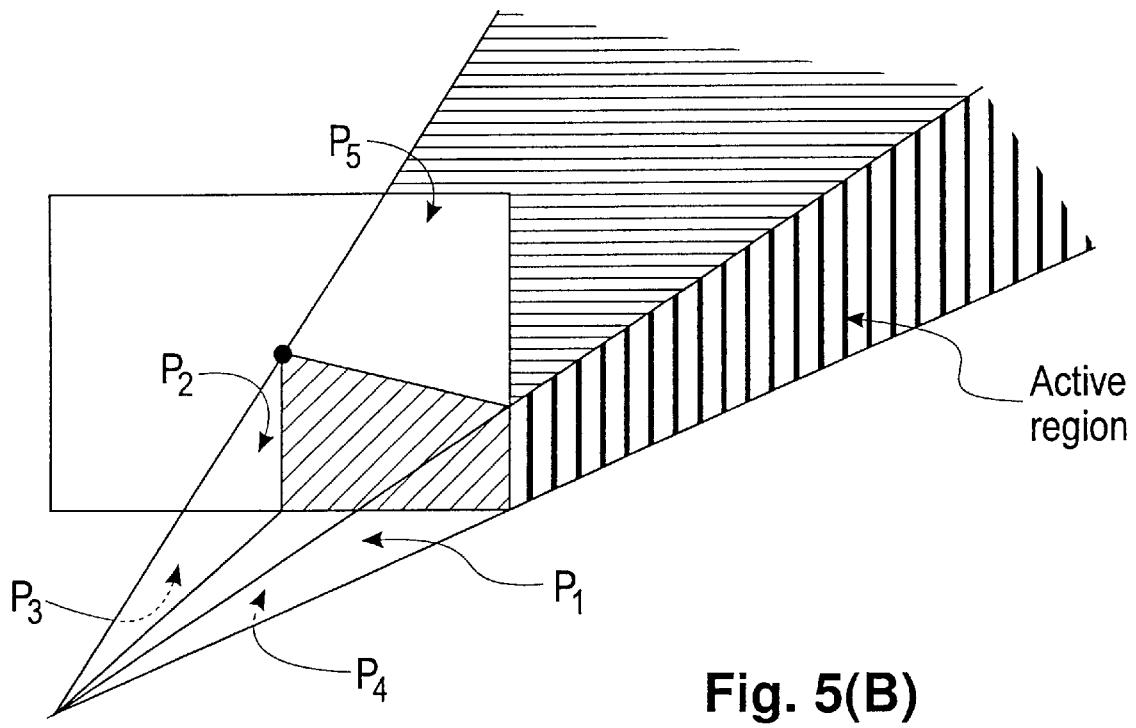

In step 611, the active region defined by the shield is determined, and the operation continues to step 613. Preferably, the active region of the shield is determined from the intersection of the shield and the viewing frustrum. For example, FIG. 5(A) shows a shield and a viewing frustrum, and FIG. 5(B) shows the active region corresponding to the shield. The active region is preferably represented as an appropriate boolean combination of planes. For example, the active region in FIG. 5(B) is represented as the boolean intersection of half spaces induced from planes P1, P2, P3, P4, and PS—where P1 passes through the eye e and is derived from unit vectors along rays f4 and s1, where P2 passes through the eye e and is derived from unit vectors along rays s1 and s2, where P3 passes through the eye e and is derived from unit vectors along rays s2 and s3, and where PS is the plane containing the shield. The half spaces in turn are preferably derived from converting linear equations of planes in inequalities with appropriate sense (<= or >=). A more detailed discussion of deriving such a boolean combination of planes is set forth in Requicha, "Representation of Rigid Solids: Theory, Methods and Systems", ACM Computer Surveys, Vol.12, No. 4, 1980, pp. 437–464, herein incorporated by reference in its entirety. In the event that the visible region has a complex geometry, the representation of the visible region may be replaced by an approximation having a less complex geometry.

In step 613, a culling operation is performed to identify those objects (or portions thereof) that lie in the active region defined by the shield, and to mark the identified objects (or portions thereof) as hidden. This may be accomplished by setting an identifier associated with the identified object (or portion thereof) to a predetermined value that indicates the object (or portion) is hidden. Preferably, the culling operation of step 613 is performed on those objects (or portions thereof) that are marked potentially visible. The operation then continues to step 615.

In step 615, it is determined if all shields have been processed. If so, operation continues to step 617; otherwise operation reverts back to step 607 for the next unprocessed shield.

In step 617, a graphics order is transferred to the graphics system to render all objects (or portions thereof) that have been marked potentially visible, and the preprocessing step ends.

Upon receiving the graphics order generated during preprocessing, the graphics subsystem renders the potentially visible objects (or portion thereof) for display on the display device.

As described above, the shield works as a one-way occluder (i.e., one side of the shield is active and the other side of the shield in inactive. However, a shield may work as a two-way occluder. In this scenario, both sides of the shield are active no matter where the viewpoint is positioned. Shields are particularly useful when the geometry in the scene does not lend to automatic occluders. This arises frequently in complex mechanical assemblies, where the notions of walls are not that apparent. Thus, shields are extremely flexible and provide occluders in scenes where one may not be easily present. Another important aspect is that shields are defined completely upon user convenience. This means that a shield may be used simply as a mechanism to ignore regions not of interest.

In an alternate embodiment of the present invention, one or more shields may be selectively associated with a given set of objects, and thus disassociated with the complementary set of objects. In this case, the affectivity of a particular shield applies only to those objects within the set of objects that are selectively associated with the particular shield. In this embodiment, step 613 of the preprocessing operation is preferably modified to cull only those objects within the set of objects that are selectively associated with the particular shield.

Figure 7A:
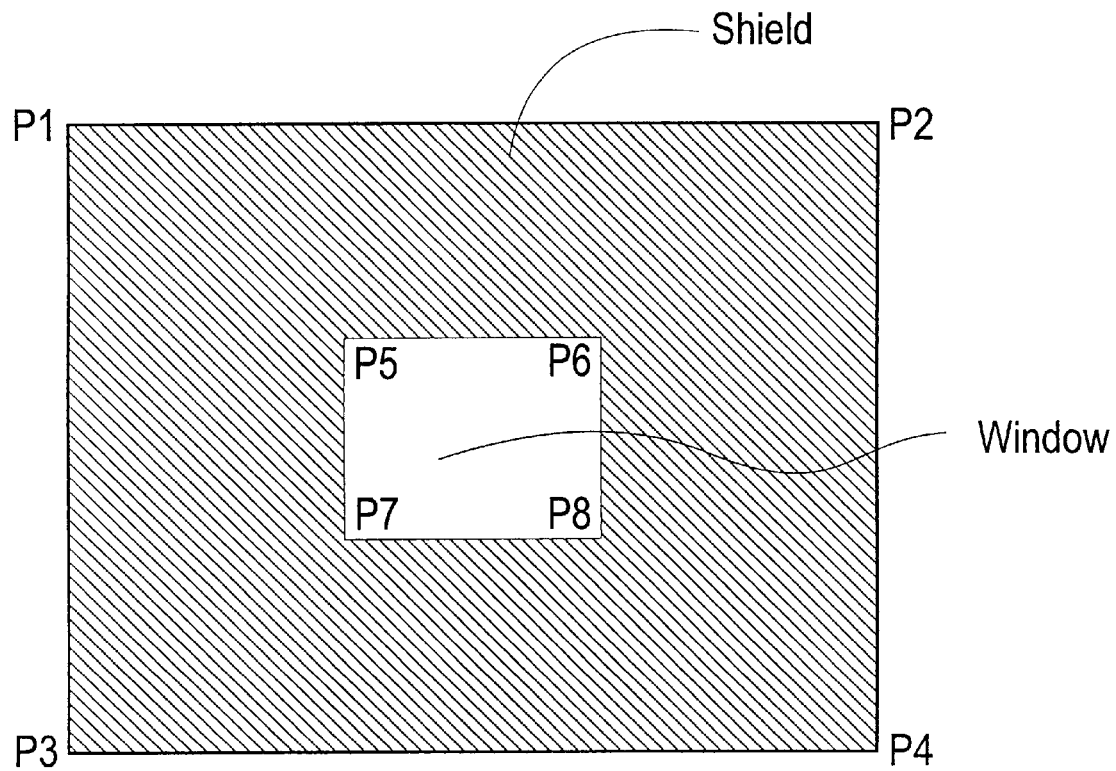
FIGS. 7(A) and (B) illustrate a shield with a window according to the present invention.
Figure 7B:
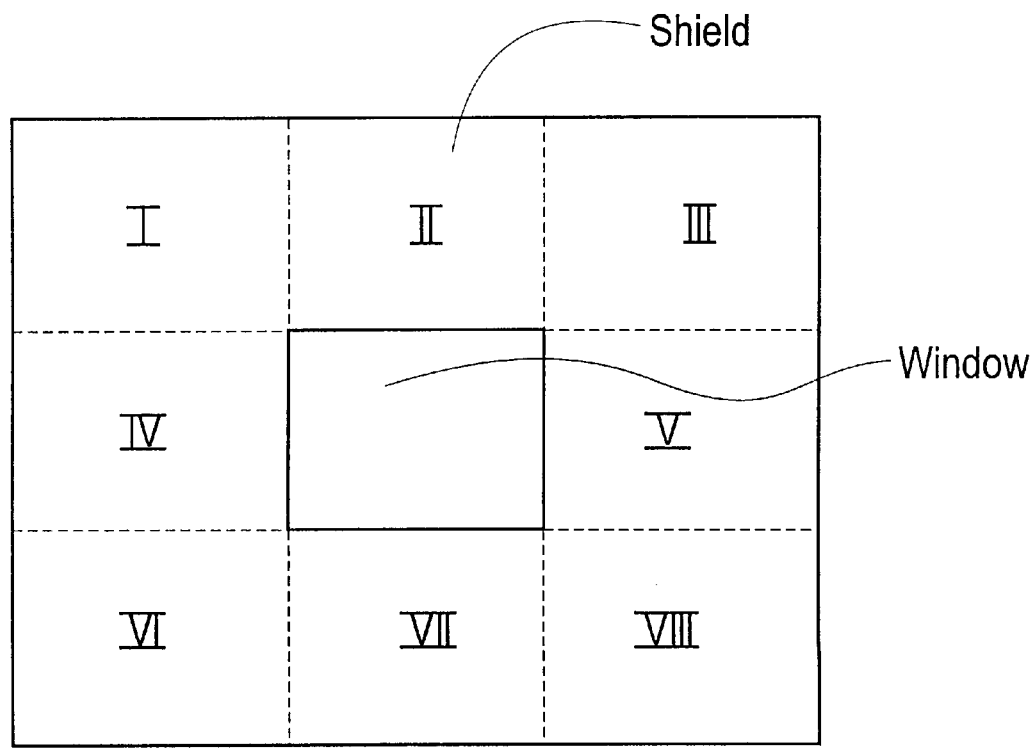

In another embodiment of the present invention, the shields as described above may have one or more associated windows. In this case, the shield with one or more windows may be represented by a boolean expression of geometries. For example, as shown in FIG. 7(A), a rectangular shield may have a square window (defined by the points p5,p6,p7, p8) in the middle of the shield. In this example, the shield with window may be represented by a boolean union of rectangles I, II, III, . . . VIII as shown in FIG. 7(B). In this embodiment, the boolean union of geometries that defines the shield are processed during the preprocessing phase as described above with respect to FIG. 6.

In another embodiment of the present invention, the shields and preprocessing as described above may be utilized together with visibility sets to provide for efficient visibility determination when the camera is moved between view points. A visibility set defines a set of objects (or polygons) associated with a given viewpoint. A more detailed description of visibility sets may be found in "Visibility Preprocessing for Interactive Walkthroughs", by S. J. Teller and C. H. Sequin, SIGGRAPH 91, Computer Graphics, vol. 25, no. 4, pp. 61–69, 1991, herein incorporated by reference in its entirety. In this paper, sets of objects (or visibility sets) are associated with "cells" in a restricted class of axis-aligned architectural scenes.

Figure 8A:
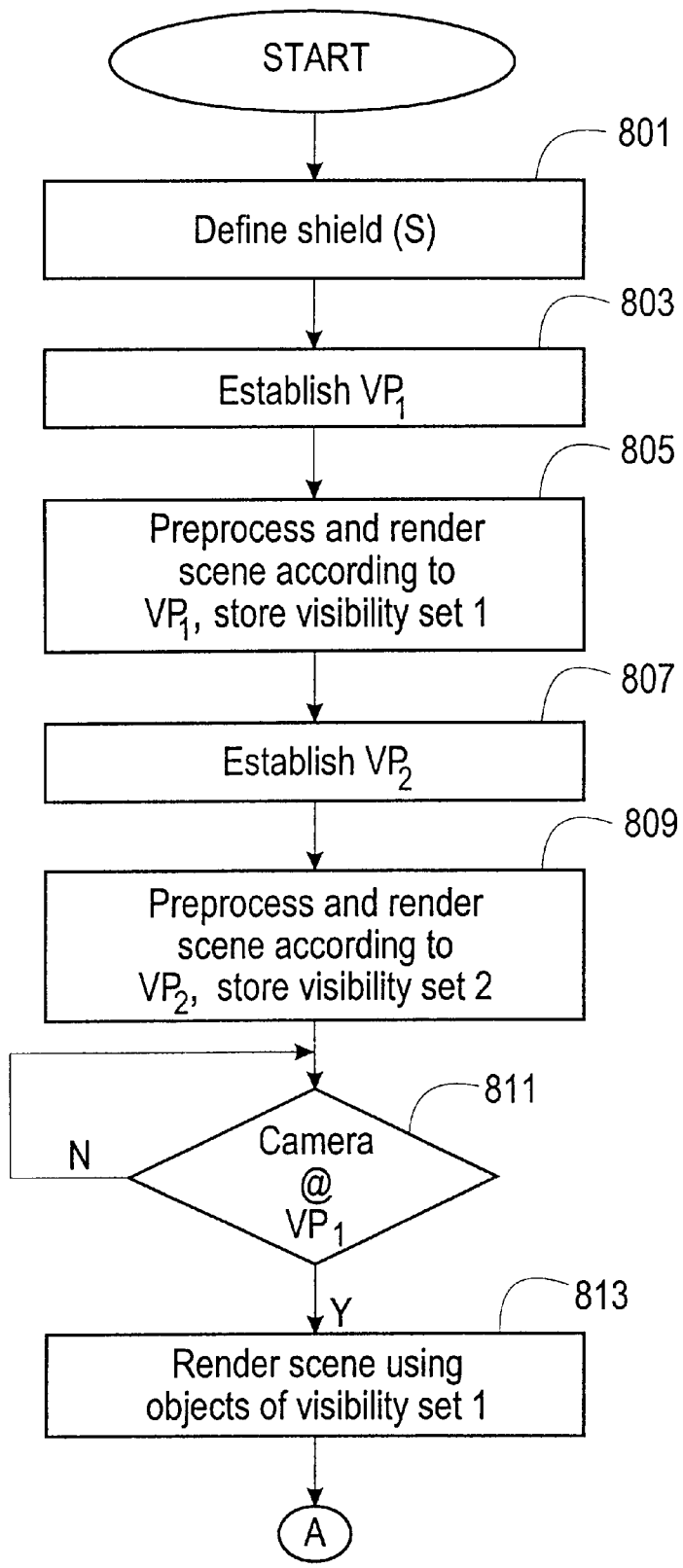
FIGS. 8(A) and (B) is a flow chart illustrating operation of the graphics system in utilizing one or more shields and associated preprocessing together with visibility sets according to the present invention.
Figure 8B:
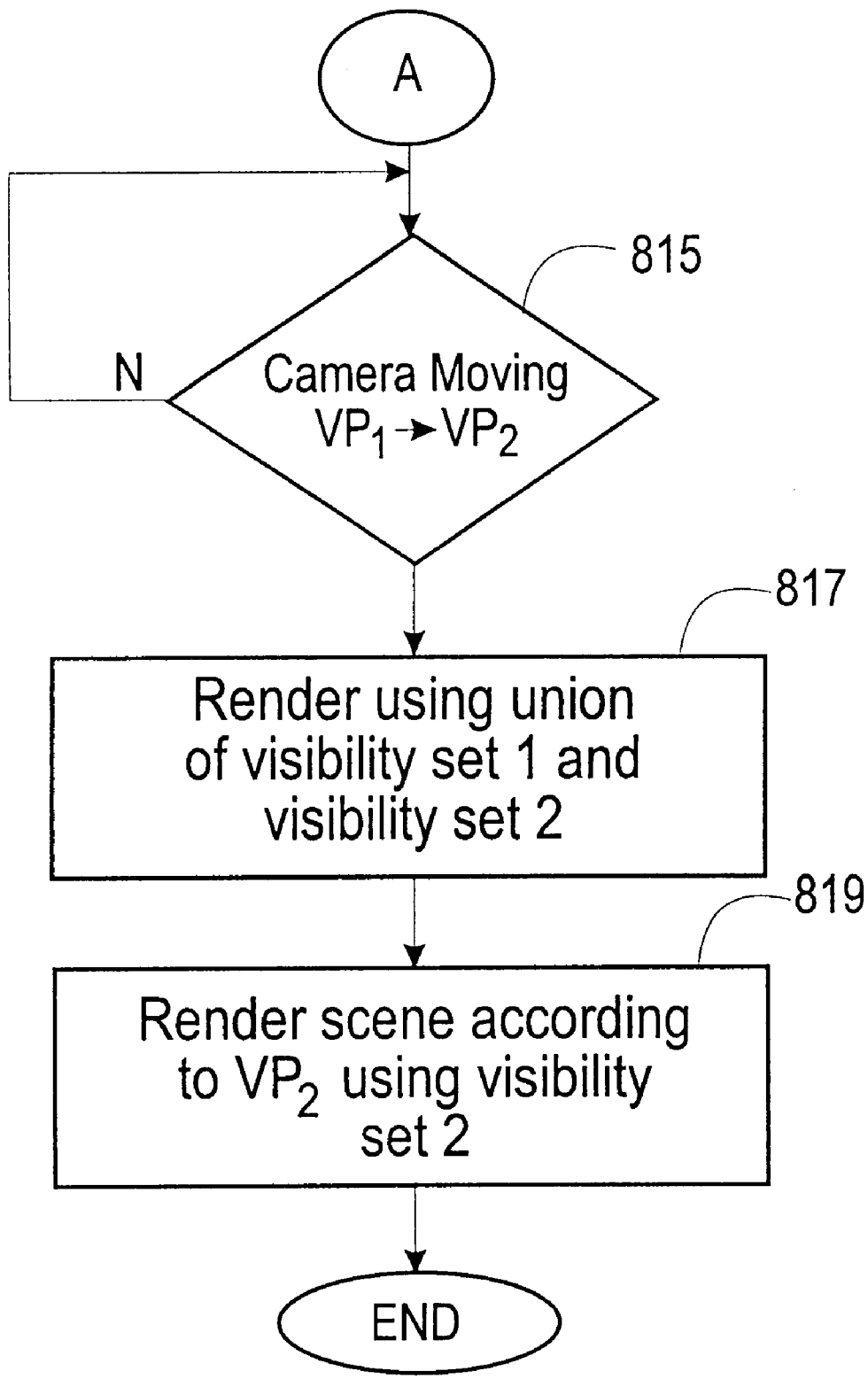

In this embodiment, as illustrated in FIGS. 8(A) & (B), one or more shields are defined by the user and associated with a scene. In step 803, a first view point (i.e., a first camera position, orientation, and view angle) is established according to user input. In step 805, the preprocessing and rendering described above is performed for the first view point, and a first visibility set of objects that contribute to the scene as viewed from the first view point is stored, for example, in the system memory 104.

In step 807, a second view point (i.e., a second camera position, orientation, and view angle) is established according to user input. In step 809, the preprocessing and rendering described above is performed for the second view point, and a second visibility set of objects that contribute to the scene as viewed from the second view point is stored, for example, in the system memory 104.

In step 811, it is determined if the camera is positioned at the first view point (or at a point within a predetermined tolerance band from the first view point); and, if so, in step 813 the scene is rendered using the objects of the first visibility set.

In step 815, is its determined if the position of the camera moves from the first view point (or from a point within a predetermined tolerance band from the first view point) to the second view point (or to a point with a predetermined tolerance band from the second view point); and, if so, in step 817 the scene is rendered using the objects represented by the union of the first and second visibility sets. Step 817 is preferably performed while the position of the camera is interpolated to the second view point. Subsequent or concurrent with step 817, step 819 is performed whereby the scene is rendered according to the second view point using the objects of the second visibility set.

The combination of shields and visibility sets will typically result in large reduction in the number of objects to be rendered in complex scenes. Importantly, the reduction of the objects rendered in complex scenes is not just restricted to particular domains (e.g. axis-aligned architectural models). Furthermore, the visibility set operations during the camera interpolation tend to typically retain the image fidelity and perceptual coherence during motion, thereby resulting in better performance (faster frame update) as well as better fidelity (greater resolution) for the same scene complexity.

While the invention has been shown and described with reference to particular embodiments thereof, it will be understood by those skilled in the art that the foregoing and other changes in form and detail may be made therein without departing from the spirit and scope of the invention.

We claim:

1. In a computer graphics system wherein a scene is represented by a plurality of three dimensional objects situated in a first coordinate system, wherein each object is represented by graphics data that represent one or more primitives, a method for rendering the scene according to a camera having a characteristic position, orientation and field of view in the first coordinate system, the method comprising the steps of:

in response to user input, defining a shield that defines first and second regions in the first coordinate system, said first and second regions depending upon position and orientation of said shield with respect to said camera, wherein said shield is distinct from said plurality of objects that represent said scene;

preprocessing said scene for generating first graphics data that represents portions of first objects that lie in said first region; and rendering said first graphics data to thereby render portions of said first objects that lie in said first region without rendering portions of objects that lie in said second region.

2. The method of claim 1, wherein said shield is a two dimensional piece of geometry situated in the first coordinate system.

3. The method of claim 1, wherein said shield is a rectangle.

4. The method of claim 1, wherein a sense is associated with said shield, and wherein said first and second regions defined by said shield depend upon said sense.

5. The method of claim 1, wherein said first and second regions defined by said shield depend upon position of said camera with respect to said first region.

6. The method of claim 1, wherein the step of preprocessing said scene for generating first graphics data that represents portions of first objects that lie in said first region includes the steps of:

determining if the shield intersects a viewing frustrum defined by the characteristic position, orientation and field of view in the first coordinate system of said camera;

upon determining that the shield intersects the viewing frustrum, determining the first region according to intersection of the shield and the viewing frustrum; and performing a culling operation that generates said first graphics data.

7. The method of claim 6, wherein said first region is represented by a boolean composition of planes.

8. The method of claim 1, wherein said first objects comprise a set of objects selectively associated with said shield.

9. The method of claim 1, wherein said shield includes at least one window associated with said shield.

10. The method of claim 1, wherein said first objects are stored as a visibility set associated with the position of said camera.

11. In a computer graphics system wherein a scene is represented by a plurality of three dimensional objects situated in a first coordinate system, wherein each object is represented by graphics data that represent one or more primitives, an apparatus for rendering the scene according to a camera having a characteristic position, orientation and field of view in the first coordinate system, the apparatus comprising:

means, responsive to user input, for defining a shield that defines first and second regions in the first coordinate system, said first and second regions depending upon position and orientation of said shield with respect to said camera, wherein said shield is distinct from said plurality of objects that represent said scene;

means for generating first graphics data that represents portions of first objects that lie in said first region; and means for rendering said first graphics data to thereby render portions of said first objects that lie in said first region without rendering portions of objects that lie in said second region.

12. The apparatus of claim 11, wherein said shield is a two dimensional piece of geometry situated in the first coordinate system.

13. The apparatus of claim 11, wherein said shield is a rectangle.

14. The apparatus of claim 11, wherein a sense is associated with said shield, and wherein said first and second regions defined by said shield depend upon said sense.

15. The apparatus of claim 11, wherein said first and second regions defined by said shield depend upon position of said camera with respect to said first region.

16. The apparatus of claim 11, wherein said means for generating first graphics data comprises:

means for determining if the shield intersects a viewing frustrum defined by the characteristic position, orientation and field of view in the first coordinate system of said camera;

means for determining the first region according to intersection of the shield and the viewing frustrum upon determining that the shield intersects the viewing frustrum; and means for performing a culling operation that generates said first graphics data.

17. The apparatus of claim 16, wherein said first region is represented by a boolean composition of planes.

18. The apparatus of claim 11, wherein said first objects comprise a set of objects selectively associated with said shield.

19. The apparatus of claim 11, further comprising means for selectively associating said set of object with said shield according to user input.

20. The apparatus of claim 11, wherein said shield includes at least one window associated with said shield.

21. The apparatus of claim 11, wherein said first objects are stored as a visibility set associated with the position of said camera.

* * * * *